US010308179B2

(12) United States Patent
Petzold et al.

(10) Patent No.: US 10,308,179 B2
(45) Date of Patent: Jun. 4, 2019

(54) DEVICE AND METHOD FOR PROVIDING A VEHICLE SURROUND VIEW

(71) Applicants: Conti Temic Microelectronic GmbH, Nuremberg (DE); Deere & Company, Moline, IL (US)

(72) Inventors: Johannes Petzold, Muenchberg (DE); Kilian Wolff, Moline, IL (US); Denis Selensky, Frankfurt (DE); Wolfram Haiges, Moline, IL (US)

(73) Assignees: Conti Temic Microelectronic GMBH, Nuremberg (DE); Deere & Company, Moline, IL (US)

( * ) Notice: Subject to any disclaimer, the term of this patent is extended or adjusted under 35 U.S.C. 154(b) by 262 days.

(21) Appl. No.: 15/334,363

(22) Filed: Oct. 26, 2016

(65) Prior Publication Data

US 2017/0120820 A1 May 4, 2017

(30) Foreign Application Priority Data

Oct. 30, 2015 (DE) ........................ 10 2015 221 356

(51) Int. Cl.
*B60R 1/00* (2006.01)
*E02F 9/24* (2006.01)
(Continued)

(52) U.S. Cl.
CPC .................. *B60R 1/00* (2013.01); *E02F 9/24* (2013.01); *E02F 9/261* (2013.01); *G06K 9/00791* (2013.01); *G06T 3/0062* (2013.01); *H04N 7/181* (2013.01); *H04N 9/3179* (2013.01); *B60R 2300/105* (2013.01); *B60R 2300/50* (2013.01); *E02F 9/024* (2013.01); *E02F 9/028* (2013.01);
(Continued)

(58) Field of Classification Search
CPC ...................................................... B60R 10/00
USPC .......................................................... 348/148
See application file for complete search history.

(56) References Cited

U.S. PATENT DOCUMENTS 7,307,655 B1 12/2007 Okamoto et al.
2008/0309784 A1 12/2008 Asari et al.
(Continued)

FOREIGN PATENT DOCUMENTS

DE 10253378 A1 6/2003
DE 102010041490 A1 3/2012
(Continued)

OTHER PUBLICATIONS

European Search Report corresponding to application No. 16195573.7, dated Mar. 22, 2017 (8 pages).

*Primary Examiner* — Yulin Sun
(74) *Attorney, Agent, or Firm* — Maginot, Moore & Beck LLP

(57) ABSTRACT

Device and method for providing a vehicle surround view for a vehicle, which is located on a driving plane, comprising vehicle cameras, which provide camera images of a vehicle environment of the vehicle, a location-detection unit, which detects a change in location of at least one vehicle camera relative to the driving plane of the vehicle, and comprising an image data processing unit which projects the camera images provided by the vehicle cameras onto a projection surface to generate the vehicle surround view, which projection surface is adapted according to the detected change in location of the vehicle camera.

16 Claims, 5 Drawing Sheets

(51) Int. Cl.

| | |
|---|---|
| ***E02F 9/26*** | (2006.01) |
| ***G06T 3/00*** | (2006.01) |
| ***H04N 7/18*** | (2006.01) |
| ***H04N 9/31*** | (2006.01) |
| ***G06K 9/00*** | (2006.01) |
| *E02F 9/02* | (2006.01) |
| *E02F 9/08* | (2006.01) |
| *G06K 9/36* | (2006.01) |

(52) U.S. Cl.
CPC ........ *E02F 9/085* (2013.01); *G06K 2009/363* (2013.01)

(56) References Cited

U.S. PATENT DOCUMENTS

| | | | | |
|---|---|---|---|---|
| 2012/0262580 | A1 | 10/2012 | Huebner et al. | |
| 2012/0287232 | A1 | 11/2012 | Natroshvili et al. | |
| 2013/0162830 | A1 | 6/2013 | Mitsuta et al. | |
| 2014/0036076 | A1* | 2/2014 | Nerayoff ................ | H04N 7/181 348/148 |

FOREIGN PATENT DOCUMENTS

| | | | |
|---|---|---|---|
| DE | 11 2012 004 354 | T5 | 7/2014 |
| EP | 1115250 | B1 | 6/2012 |
| EP | 2 511 137 | A1 | 10/2012 |
| JP | 2013074350 | A | 4/2013 |
| JP | 2014225803 | A | 12/2014 |
| WO | WO93/05640 | | 4/1993 |
| WO | WO95/16228 | | 6/1995 |
| WO | 2015048967 | A1 | 4/2015 |

* cited by examiner

DEVICE AND METHOD FOR PROVIDING A VEHICLE SURROUND VIEW

This application claims priority under 35 U.S.C. § 119 to patent application no. DE 10 2015 221 356.0, filed on Oct. 30, 2015 in Germany, the disclosure of which is incorporated herein by reference in its entirety.

The disclosure relates to a device and to a method for providing a vehicle surround view for a vehicle, in particular for an agricultural utility vehicle.

BACKGROUND

Driver assistance systems for vehicles increasingly offer the possibility of displaying a vehicle surround view to the driver of the vehicle on a display unit in order to assist the driver in carrying out various driving manoeuvres. For this purpose, vehicle cameras, which are attached in the vehicle, provide camera images of an environment of the vehicle. In order to generate a vehicle surround view, said camera images are projected onto a projection surface by an image data processing unit of the driver assistance system. The vehicle surround view generated in this way is subsequently displayed to the driver of the vehicle on a display unit or a screen.

The vehicle cameras which are attached to the vehicle body of the vehicle can be calibrated intrinsically or extrinsically to continuously transmit the camera images of the environment of the vehicle to the image data processing unit of the driver assistance system. The camera images obtained from the vehicle cameras are mapped or projected onto a projection surface by the image data processing unit to generate a vehicle surround view. In conventional driver assistance systems, the projection surface is provided for a horizontal driving plane.

Agricultural utility vehicles can also be used in locations on slopes. Furthermore, some construction vehicles comprise for example stabilisers which can be folded out or extended in order to increase the stability of the construction vehicle. Said stabilisers influence the inclination of the construction vehicle in relation to the ground. The stabilisers and/or other actuators, for example excavator gripper arms or shovels, are also used in part to tilt the construction vehicle in a controlled manner. This is especially helpful in the case of a fine ground, in order to produce an oblique side wall, in particular when excavating a trench.

If a vehicle is located on an inclined driving plane or slope plane, or if the inclination of the vehicle is tilted, for example by extendable stabilisers, the change in location of the vehicle cameras which are attached to the vehicle body, relative to the normal, substantially horizontally extending driving plane or standing plane of the vehicle results in projection or image distortions, which reduce the image quality of the displayed vehicle surround view.

One problem addressed by the present disclosure is thus that of providing a method and a device for providing a vehicle surround view for a vehicle, in which sufficient image quality of the vehicle surround view is ensured in the case of any desired inclination of the vehicle or of the driving or standing plane.

This problem is solved according to the disclosure by a device for providing a vehicle surround view for a vehicle having the features described herein.

SUMMARY

According to a first aspect, the disclosure thus provides a device for providing a vehicle surround view for a vehicle, comprising:

vehicle cameras which provide camera images of an environment of the vehicle, a location-detection unit, which detects a change in location of at least one vehicle camera relative to a normal driving or standing plane of the vehicle, and comprising an image data processing unit which projects the camera images provided by the vehicle cameras onto a projection surface to generate the vehicle surround view, which projection surface is adapted according to the detected change in location of the vehicle camera.

In one possible embodiment of the device according to the disclosure, the image data processing unit is designed to rotate the projection surface about one or more axes of rotation relative to the normal driving or standing plane and/or to shift said projection surface in a translational manner relative to a coordinate system origin, according to the detected change in location of the at least one vehicle camera.

In one possible embodiment of the device according to the disclosure, the projection surface used by the image data processing unit is a dish-shaped projection surface which is dynamically adapted according to the detected change in location of the at least one vehicle camera.

In one possible embodiment of the device according to the disclosure, an inclination-capture unit is provided, which captures a currently existing inclination of the vehicle relative to a normal driving or standing plane.

In another possible embodiment of the device according to the disclosure, a location-detection unit is provided, which detects a change in location of the at least one vehicle camera relative to the normal driving or standing plane of the vehicle according to the inclination captured by the inclination-capture unit.

In another possible embodiment of the device according to the disclosure, an inclination-compensation unit is provided, which compensates for the inclination captured by the location-capture unit in such a way that a driver's seat provided in a driver's cabin of the vehicle and/or a working assembly of the vehicle is oriented in a substantially horizontal manner.

In another possible embodiment of the device according to the disclosure, the image data processing unit is configured to generate a rotation matrix based on angles of inclination which are captured by the inclination-capture unit.

In another possible embodiment of the device according to the disclosure, projection surface points of the projection surface are multiplied by the generated rotation matrix by means of the image data processing unit to dynamically adapt the projection surface.

In another possible embodiment of the device according to the disclosure, the vehicle cameras are attached to a vehicle body of the vehicle and/or to a driver's cabin of the vehicle.

In another possible embodiment of the device according to the disclosure, the driver's cabin is mounted so as to be rotatable, together with the vehicle cameras which are attached thereto, relative to the vehicle body of the vehicle.

In another possible embodiment of the device according to the disclosure, a rotation-capture unit is provided, which captures a rotation of the driver's cabin relative to the vehicle body of the vehicle.

In another possible embodiment of the device according to the disclosure, the location-detection unit detects the change in location of the at least one vehicle camera according to the rotation of the driver's cabin relative to the vehicle body which is captured by the rotation-capture unit.

In another possible embodiment of the device according to the disclosure, a display unit is provided, which visually displays the generated vehicle surround view to a driver of the vehicle.

In one possible embodiment, the vehicle (F) is placed in a position which is inclined with respect to a normal, substantially horizontally extending, driving or standing plane by means of actuators or stabilisers. Alternatively, the vehicle is located on a slope plane which is tilted with respect to a normal, substantially horizontal, driving or standing plane.

According to another aspect, the disclosure further provides a method for providing a vehicle surround view for a vehicle, having the features disclosed herein.

The disclosure thus provides a method for providing a vehicle surround view for a vehicle, comprising the steps of:

- generating camera images of the vehicle environment,
- detecting a change in location of the vehicle cameras relative to a normal driving or standing plane of the vehicle (F),
- adapting a projection surface according to the detected change in location of the vehicle cameras, and
- projecting the generated camera images onto the adapted projection surface in order to generate the vehicle surround view.

According to another aspect, the disclosure further provides a driver assistance system having the features disclosed herein.

The disclosure thus provides a driver assistance system for a vehicle, comprising a device for providing a vehicle surround view for the vehicle, said device comprising:

- vehicle cameras which provide camera images of an environment of the vehicle,
- a location-detection unit, which detects a change in location of at least one vehicle camera relative to a normal driving or standing plane of the vehicle, and comprising
- an image data processing unit which projects the camera images provided by the vehicle cameras onto a projection surface to generate the vehicle surround view, which projection surface is adapted according to the detected change in location of the vehicle camera.

According to another aspect, the disclosure further provides a vehicle comprising a driver assistance system of this type. The vehicle is preferably an agricultural vehicle, in particular a construction vehicle, an agricultural utility vehicle or a forestry vehicle.

BRIEF DESCRIPTION OF THE DRAWINGS

Hereinafter, various embodiments of the method according to the disclosure and of the device according to the disclosure for providing a vehicle surround view will be described in greater detail with reference to the accompanying drawings, in which.

DETAILED DESCRIPTION

Figure 1:
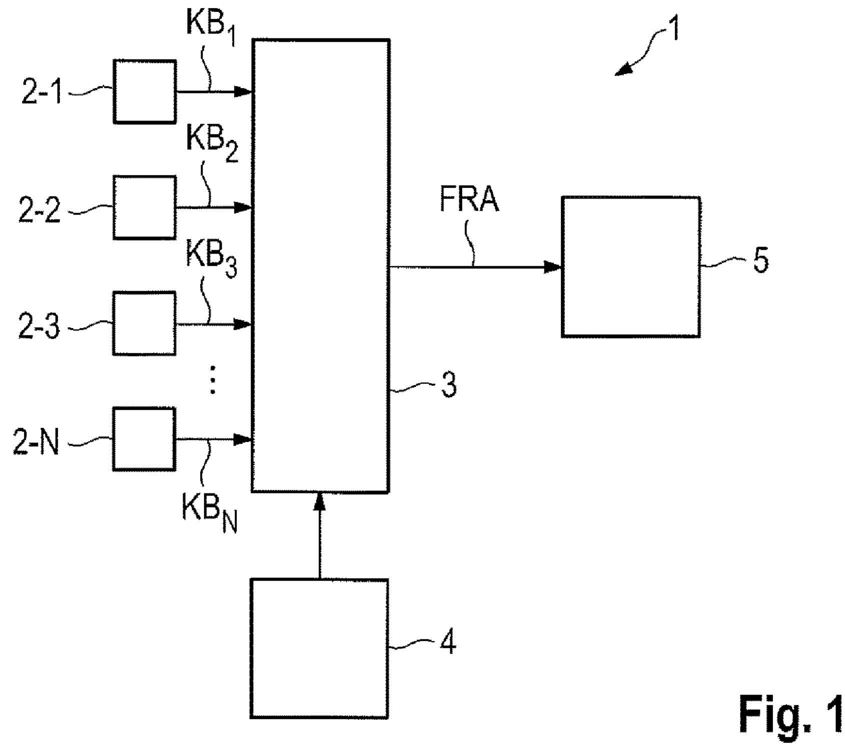
FIG. 1 is a block diagram showing a possible first embodiment of the device according to the disclosure for providing a vehicle surround view.

The block diagram shown in FIG. 1 shows one embodiment of a device 1 according to the disclosure for providing a vehicle surround view FRA for a vehicle F. The device shown in FIG. 1 for providing a vehicle surround view preferably forms part of a driver assistance system for a vehicle F, in particular an agricultural vehicle which is located on a driving plane or standing plane. Said vehicle F can move over the driving plane FE in an engine-driven manner, or can stand on a standing plane. The device 1 comprises a plurality of vehicle cameras 2-*i*, which preferably continuously provide camera images KB of a vehicle environment of the vehicle F and supply said images to an image data processing unit 3 via signal lines. The number N of vehicle cameras 2 can vary for different vehicles F. In one possible embodiment of the device 1 according to the disclosure, at least four vehicle cameras 2 are provided. In one possible embodiment, the vehicle cameras 2 can be what are known as fisheye cameras, which have a horizontal aperture angle of more than 170°. The vehicle cameras 2 can be attached to a vehicle body KAR of the vehicle F. Preferably, the vehicle cameras 2 are provided on different sides of the vehicle body KAR, for example on the front, rear, left and right. Furthermore, in one possible embodiment, vehicle cameras 2 can also be attached to a driver's cabin KAB which is rotatably mounted on the vehicle body KAR. Vehicle cameras 2 continuously provide camera images or image data to the image data processing unit 3.

Figure 6:
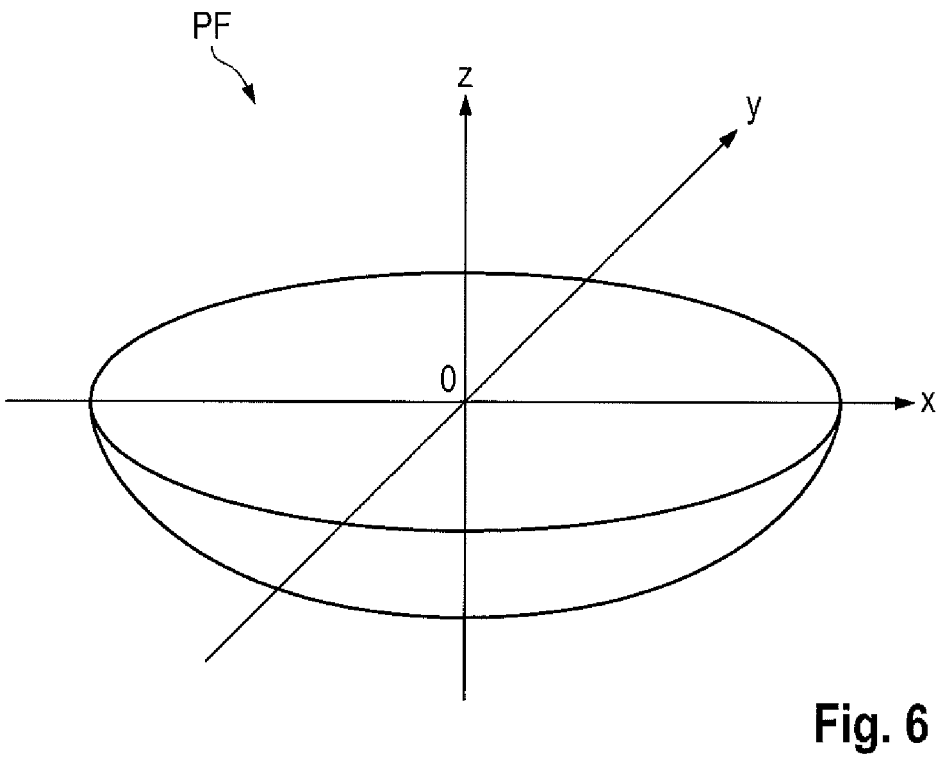
FIG. 6 is a schematic view of a dish-shaped projection surface of the type which can be used in the method according to the disclosure.

The device 1 further comprises a location-detection unit 4 which detects a change in location of at least one or all of the vehicle cameras 2-*i* relative to a normal driving or standing plane of the vehicle F. The normal driving or standing plane preferably extends in a substantially horizontal manner. The image data processing unit 3 projects the camera images KB received from the vehicle cameras 2 onto a projection surface PF to generate the vehicle surround view FRA. Said projection surface PF is adapted by the image data processing unit 3 according to the detected change in location of the at least one vehicle camera 2 relative to the normal driving or standing plane. In this case, the projection surface PF is preferably a three-dimensional, dish-shaped projection surface, as shown in FIG. 6. The vehicle surround view FRA calculated by the image data processing unit 3 is output to a display unit 5 via a signal line, which unit visually displays the vehicle surround view FRA to the driver FA of the vehicle F.

The vehicle cameras 2 and the driver assistance system are preferably calibrated for the normal, substantially horizontally extending, driving or standing plane. The normal driving or standing plane is preferably the plane which the vehicle uses in normal operation. For most vehicles, the normal reference plane is a horizontally extending plane. For special vehicles, the normal reference plane can have a different orientation.

The image data processing unit 3 preferably comprises at least one processor which rotates the projection surface PF about one or more axes of rotation x, y, z relative to the driving plane FE and/or shifts said projection surface in a translational manner relative to a coordinate original O, according to the detected change in location of the vehicle cameras 2. In one preferred embodiment, the projection surface PF used is a dish-shaped projection surface. Said projection surface is dynamically adapted according to the detected change in location of the vehicle cameras 2. Depending on the application, different projection surfaces can also be used. For example, the projection surface PF can also be formed so as to be elliptical or planar.

Figure 2:
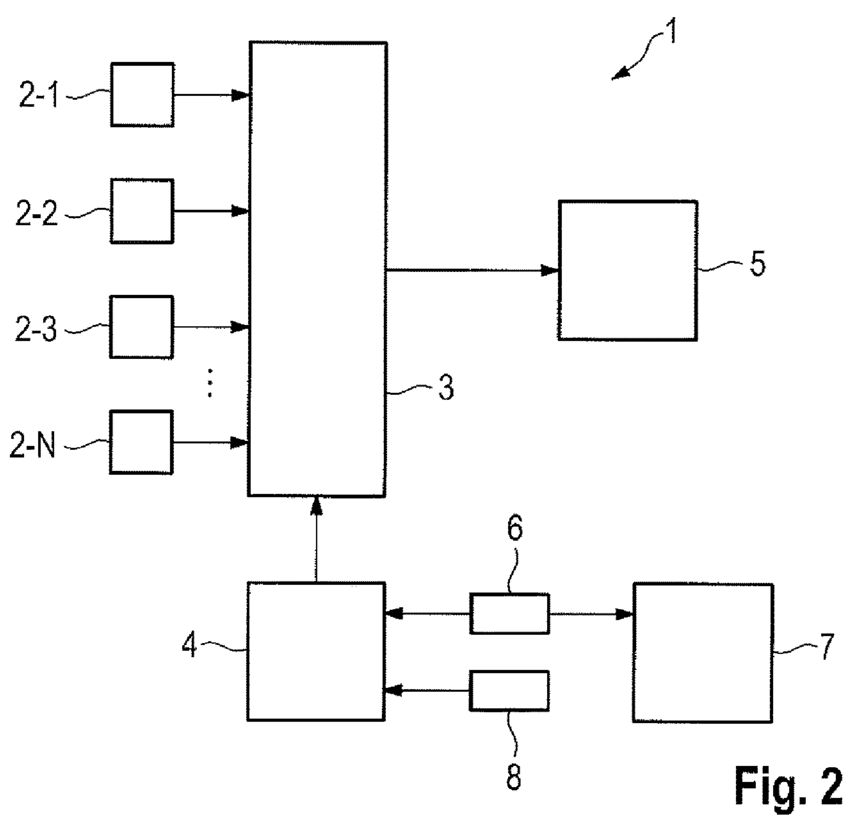
FIG. 2 is a block diagram of another possible embodiment of the device according to the disclosure for providing a vehicle surround view for a vehicle.

FIG. 2 shows another embodiment of a device 1 according to the disclosure for providing a vehicle surround view FRA for a vehicle F. In the embodiment shown in FIG. 2, the device 1 comprises an inclination-capture unit 6, which captures a currently existing inclination relative to the normal, horizontal reference plane or normal plane, or the inclination of a tilted vehicle F relative to the normal, horizontal reference plane, in particular using sensors. The location-detection unit 4 detects the change in location of the at least one vehicle camera 2 relative to a reference driving plane FE or reference standing plane SE which is used in normal operation according to the current inclination of the vehicle F relative to the normal driving plane or standing plane, which inclination is captured by the inclination-capture unit 6. In the embodiment shown in FIG. 2, the vehicle F additionally comprises an inclination-compensation unit 7. The current inclination captured by the inclination-capture unit 6 is used by the inclination-compensation unit 7 to compensate for the current inclination of the tilted driving plane FE or of the tilted vehicle F. In this case, the inclination-compensation unit 7 preferably compensates for the inclination of the tilted driving plane FE or of the tilted vehicle in such a way that the vehicle F has an optimal orientation, for example so that working assemblies of the vehicle F can work in an optimal manner. For example, in the case of a harvester-thresher, it is important for the threshing assemblies to be positioned as horizontally as possible in order to achieve optimal threshing quality. Furthermore, a driver's seat, which is provided in a driver's cabin KAB of the vehicle F, for the driver FA of the vehicle F, can be oriented by the inclination-compensation unit 7 so as to be substantially always horizontal. In this way, the driver FA of the vehicle F is always sitting in a comfortable horizontal position, even in the case of a steep inclination of the driving plane FE, a steep slope location, or a tilted position of the vehicle F. This tilted position is achieved for example by stabilisers or other actuators, in particular excavator gripper arms or shovels, in order to tilt the vehicle in a controlled manner for specific operations. In one possible embodiment, the inclination-capture unit 6 captures various angles of inclination α, β, γ of a three-dimensional, tilted driving plane FE. Said angles of inclination are supplied to the location-detection unit 4, which can pass the sensor-captured angles of inclination on to the image data processing unit 3. In one possible embodiment, the image data processing unit 3 generates a rotation matrix DM based on the obtained angles of inclination α, β, γ of the tilted driving plane FE or of the tilted vehicle. In one possible embodiment, projection surface points of the projection surface PF, in particular of the dish-shaped projection surface, are multiplied by the generated rotation matrix DM by means of a processor of the image data processing unit 3 in order to dynamically adapt the projection surface:

$$PF' = DM \cdot PF$$

In one possible embodiment of the device according to the disclosure, a driver's cabin KAB is mounted so as to be rotatable relative to the vehicle body KAR of the vehicle F, wherein a rotation-capture unit 8 captures a rotation of the driver's cabin KAB relative to the vehicle body KAR of the vehicle F. In one possible embodiment, the location-detection unit 4 detects the change in location of the at least one vehicle camera 2 relative to the driving plane FE or standing plane additionally according to the rotation of the driver's cabin KAB which is captured by the rotation-capture unit 8.

Figure 3:
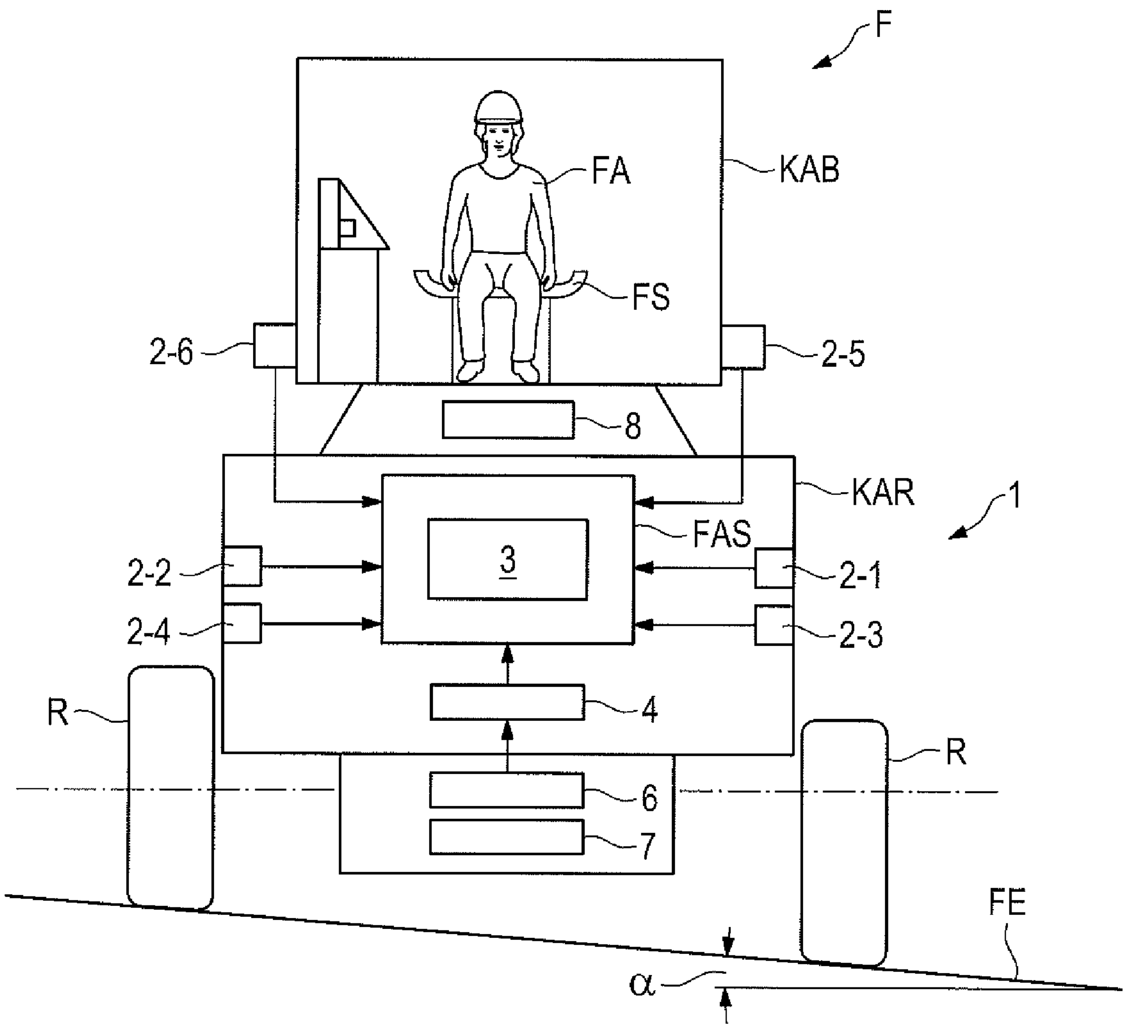
FIG. 3 is a schematic view of one possible embodiment of a vehicle which uses a driver assistance system comprising a device according to the disclosure for providing a vehicle surround view.

FIG. 3 shows one embodiment of the vehicle F comprising a driver assistance system FAS which comprises the device 1 according to the disclosure, which is shown in FIGS. 1 and 2, for providing a vehicle surround view for the vehicle F. In one possible embodiment, the vehicle F is an agricultural machine, for example a harvester-thresher, a tractor, a field chopper, a self-propelled field sprayer or a cotton picker. Furthermore, the vehicle F can also be a construction or forestry machine, for example an excavator or a timber harvesting machine. In another possible embodiment, the vehicle F is a fire engine, which is jacked up for example by means of support posts on a driving plane FE for fire extinguishing purposes. The vehicle F can also comprise lifting equipment or crane structures. Furthermore, the vehicle F can be an all-terrain vehicle or the like.

In the embodiment shown in FIG. 3, the vehicle F is an agricultural machine which is located on an inclined driving plane FE. The vehicle F stands on the driving plane or standing plane, or moves over the driving plane FE in an engine-driven manner. The vehicle F comprises a body KAR in which a driver's cabin KAB is rotatably mounted. In the embodiment shown, four vehicle cameras 2-*i* are attached to the vehicle body KAR of the vehicle F, for example to the front, rear and to the two sides of the vehicle body KAR. Moreover, in the embodiment shown, two additional vehicle cameras 2-5, 2-6 are provided on the rotatably mounted driver's cabin KAB, which cameras provide the camera images KB to the image data processing unit 3 of the driver assistance system FAS of the vehicle F. The vehicle body KAR is driven by an engine which drives the wheels R of the vehicle. The wheels R of the vehicle F are located, as shown in FIG. 3, on an inclined driving plane FE or on an inclined slope. In the example shown, the driving plane FE has an angle of inclination α. Alternatively, the vehicle F can also be placed in a position which is inclined with respect to the normal driving plane or standing plane by means of stabilisers. In this case, the ground is usually substantially planar or extends horizontally whilst the vehicle F is tilted in a controlled manner, for example by means of stabilisers or actuators. The vehicle F comprises an inclination-capture unit 6, which captures the currently existing inclination of the driving plane FE or of the inclined position of the vehicle F relative to the standing plane or the ground. For this purpose, the inclination-capture unit 6 can comprise inclination sensors which capture various angles of inclination α, β, γ of the driving plane FE or of the tilted vehicle F using sensors. The location-detection unit 4 of the device 1 detects the change in location of the vehicle cameras 2-1 to 2-6 relative to the driving plane FE or standing plane according to the inclination of the driving plane FE which is captured by the inclination-capture unit 6 using sensors or the inclination of the tilted vehicle F relative to the flat ground. The inclination-compensation unit 7 compensates for the captured inclination of the driving plane FE in such a way that a driver's seat FS which is provided in the driver's cabin FK and comprises a driver FA sitting thereon, and/or a working assembly of the vehicle F, is oriented so as to always be substantially horizontal, even in the case of a relatively steep inclination of the driving plane FE. For this purpose, preferably by means of what is known as a slope compensation function, an existing incline is compensated for by inclining the vehicle body KAR. In one possible embodiment, the compensation angle of inclination used by the slope compensation function is supplied to the location-detection unit 4, which, based on the obtained compensation angle of inclination, detects the change in location of the at least one vehicle camera 2 relative to the driving plane FE.

In the embodiment shown in FIG. 3, the driver's cabin FK is mounted so as to be rotatable relative to the vehicle body KAR of the vehicle F. The rotation-capture unit 8 captures a rotation of the driver's cabin KAB relative to the vehicle body KAR of the vehicle F, for example by means of existing rotary sensors. The location-detection unit 4 preferably detects the change in location of the at least one vehicle camera, in particular of the vehicle cameras 2-5, 2-6 shown in FIG. 3, according to the rotation of the driver's cabin KAB relative to the body KAR of the vehicle F, which rotation is captured by the rotation-capture unit 8. The vehicle cameras 2-1 to 2-4 shown in FIG. 3 are preferably what are known as fisheye cameras which are provided on the four lateral faces of the vehicle body KAR.

In one possible embodiment, the vehicle cameras 2-5, 2-6 which are attached to the vehicle body KAR are also fisheye cameras having an aperture angle of more than 170°, preferably of 175° or more. In one possible embodiment, the inclination-compensation unit 7 can comprise a swivel apparatus which is provided on the vehicle wheels R, which device keeps the vehicle F in a horizontal position within certain limits. In this case, the swivel device forms a connection between firstly a drive source and secondly a wheel carrier of the wheel R.

The location-detection unit 4 can comprise additional sensors. For example, the location-detection unit 4 can contain location sensors, in particular gyroscopic sensors, for determining the inclination of the driving plane FE and calculating therefrom the change in location of the vehicle cameras 2 relative to the driving plane FE or standing plane. In another possible embodiment, the location-detection unit 6 can use further data which is received for example by a receiver of the driver assistance system FAS. In one possible embodiment, the driver assistance system FAS comprises a GPS receiver for receiving GPS data which is evaluated by the location-detection unit 6. Furthermore, the driver assistance system FAS of the vehicle F can comprise a navigation system which transmits navigation data to the location-detection unit 6. In this case, the location-detection unit 6 additionally evaluates the obtained navigation data and/or GPS data to detect the change in location of the vehicle cameras 2 relative to the normal driving or standing plane. The adaptation of the projection surface PF by the image data processing unit 3 preferably takes place dynamically in order to take into consideration a driving plane FE which changes continuously when the vehicle F is moving. In this case, the recalculation of the projection surface PF is preferably carried out by the data processing unit 3 in real time.

The camera images KB provided by the vehicle cameras 2 are projected onto the calculated projection surface PF to generate the vehicle surround view FRA, which is displayed to the driver FA on the display unit 7. In one possible embodiment, the displayed vehicle surround view FRA is enhanced with additional information, or additional information relating to the vehicle surround view FRA is superimposed thereon. For example, an expected driving trajectory of the vehicle F due to the movement of the vehicle over the vehicle plane FE is displayed to the driver FA in an overlay view on the display unit 7. By means of the continuous dynamic adaptation of the projection surface PF, not only is the image quality of the displayed vehicle surround view FRA considerably improved, but the quality of the additionally superimposed displayed information data is also increased.

Figure 4A:
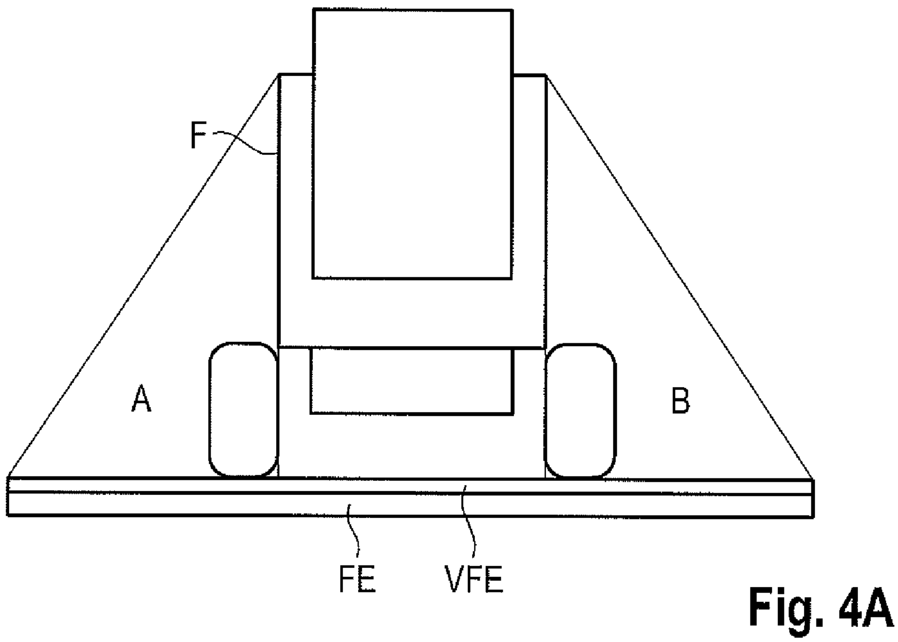
FIGS. 4A, 4B and 4C are schematic views for explaining the mode of operation of the driver assistance system shown in FIG. 3.
Figure 4B:
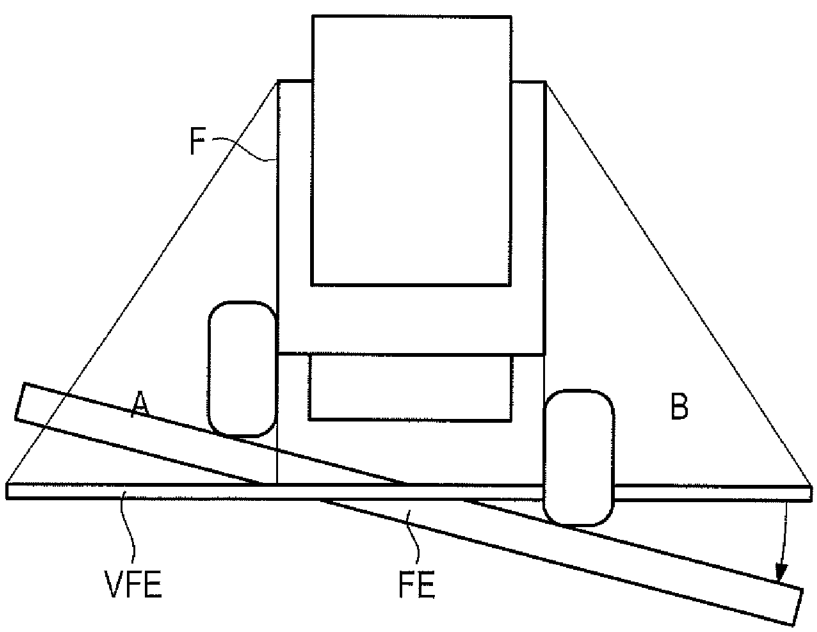
Figure 4C:
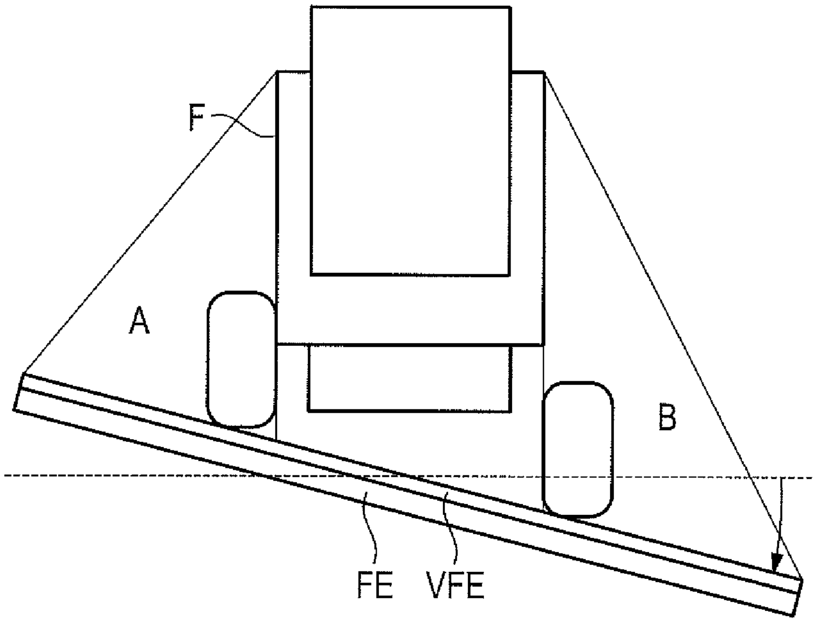

FIGS. 4A, 4B and 4C illustrate the mode of operation in one embodiment of the device 1 according to the disclosure for providing the vehicle surround view. FIG. 4A shows the situation in which a vehicle F moves over a real horizontal driving plane FE. FIG. 4A shows the projection surfaces A, B of two vehicle cameras which are attached to the sides of the vehicle body KAR of the vehicle F. If the vehicle F is located on a horizontal normal driving plane FE, a virtual driving plane VFE coincides with the real driving plane FE. The virtual and the real driving plane usually coincide, since the driver assistance system FAS is calibrated for this driving situation.

FIG. 4B shows the movement of the vehicle F on a real inclined driving plane FE. In this case, a slope compensation function can compensate for the incline by actively inclining the vehicle body. In this case, however, the virtual driving plane VFE and the real driving plane FE no longer coincide, and the projected camera image KB on the virtual driving plane VFE deviates from reality. This is very noticeable in particular in the case of overlapping image regions of adjacent vehicle cameras. Alternatively, it is also possible for the vehicle F to be tilted in a controlled manner with respect to a horizontal plane. By means of the method according to the disclosure and the device according to the disclosure for providing a vehicle surround view FRA, the distortion occurring as a result of the change in location and inclination is compensated for or minimised by continuously adapting the projection surface PF relative to the driving plane or standing plane according to the detected change in location of the vehicle cameras 2. This is illustrated schematically in FIG. 4C. A compensation angle of inclination used by a slope compensation function can be transmitted for example via a databus, for example a CAN databus, of the image data processing unit 3 which uses the supplied angle of inclination to compensate for errors. In this case, the virtual driving plane VFE can be transformed according to the angle of inclination, as shown schematically in FIG. 4C. In one possible embodiment, the dish-shaped projection surface PF is transformed by means of a rotation matrix DM. In this case, the image data processing unit 3 rotates the dish-shaped projection surface PF according to the detected change in location or the detected angle of inclination, by rotating the projection surface PF about one or more axes of rotation x, y, z and/or by moving said projection surface in a translational manner relative to a coordinate system origin O. In one possible embodiment, the rotation matrix DM is generated based on the transmitted angle of inclination and subsequently, the projection surface points of the dish-shaped projection surface are multiplied by the generated rotation matrix DM to dynamically adapt the projection surface PF. As a result, the virtual driving plane VFE is transformed, as shown in FIG. 4C, and image distortions of the vehicle surround view due to the inclined driving plane are compensated for.

Figure 5:
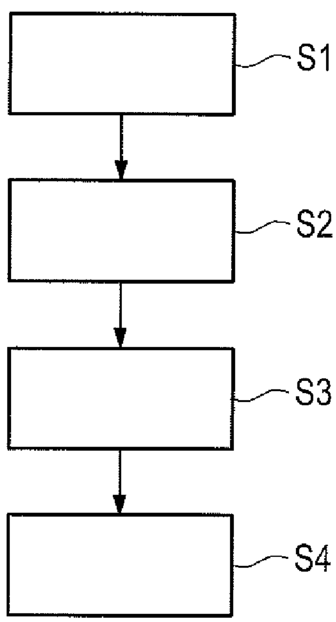
FIG. 5 is a flow diagram showing one embodiment of a method according to the disclosure for providing a vehicle surround view for a vehicle.

FIG. 5 is a flow diagram showing one embodiment of the method according to the disclosure for providing a vehicle surround view FRA for a vehicle F which is located on a driving plane FE or standing plane.

In a first step S1, camera images KB of the vehicle environment are generated by vehicle cameras 2.

In another step S2, a change in location of the vehicle cameras 2 relative to the normal driving plane FE or standing plane is detected.

Subsequently, in step S3, the projection surface PF is dynamically adapted according to the detected change in location of the vehicle cameras 2.

Lastly, in step S4, the camera images KB provided by the vehicle cameras 2 are projected onto the adapted projection surface PF' to generate the vehicle surround view FRA. Said vehicle surround view FRA is subsequently displayed to the driver FA of the vehicle F on a display unit.

In one possible embodiment, the method shown in FIG. 5 is carried out by a microprocessor of the data processing unit 3 in real time. The method according to the disclosure can be used in driver assistance systems FAS of any desired vehicles F, in particular agricultural vehicles or construction vehicles. The method according to the disclosure is suitable in particular for vehicles which are located on a steeply inclined plane during operation, or which are tilted in a controlled manner with respect to a plane in order to carry out specific work.

What is claimed is:

1. A device for providing a vehicle surround view for a vehicle, comprising:

vehicle cameras which provide camera images of a vehicle environment of the vehicle;

a location-detection unit which detects a change in location of at least one vehicle camera relative to a normal driving or standing plane of the vehicle; and an image data processing unit which projects the camera images provided by the vehicle cameras onto a projection surface to generate the vehicle surround view, which projection surface is adapted according to the detected change in location of the vehicle camera, wherein the image data processing unit is operable to at least one of (i) rotate the projection surface about one or more axes of rotation relative to the normal driving or standing plane and (ii) shift said projection surface in a translational manner relative to a coordinate system origin, according to the detected change in location of the at least one vehicle camera.

2. Device according to claim 1, wherein the projection surface is a dish-shaped projection surface which is dynamically adapted according to the detected change in location of the at least one vehicle camera.

3. A device for providing a vehicle surround view for a vehicle, comprising:

vehicle cameras which provide camera images of a vehicle environment of the vehicle;

a location-detection unit which detects a change in location of at least one vehicle camera relative to a normal driving or standing plane of the vehicle; and an image data processing unit which projects the camera images provided by the vehicle cameras onto a projection surface to generate the vehicle surround view, which projection surface is adapted according to the detected change in location of the vehicle camera, wherein an inclination-capture unit captures a currently existing inclination of the vehicle relative to the normal driving or standing plane.

4. Device according to claim 3, wherein the location-detection unit detects the change in location of the at least one vehicle camera relative to the normal driving or standing plane according to the inclination captured by the inclination-capture unit.

5. Device according to claim 4, wherein an inclination-compensation unit compensates for the inclination captured by the location-capture unit in such a way that at least one of a driver's seat provided in a driver's cabin and a working assembly of the vehicle is oriented in a substantially horizontal manner.

6. Device according to claim 3, wherein the image data processing unit generates a rotation matrix based on angles of inclination which are captured by the inclination-capture unit.

7. Device according to claim 6, wherein projection surface points of the projection surface are multiplied by the generated rotation matrix by the image data processing unit to dynamically adapt the projection surface.

8. Device according to claim 1, wherein the vehicle cameras are attached to at least one of a vehicle body of the vehicle and a driver's cabin of the vehicle.

9. Device according to claim 8, wherein the driver's cabin is mounted so as to be rotatable relative to the vehicle body of the vehicle.

10. Device according to claim 9, wherein a rotation-capture unit captures a rotation of the driver's cabin relative to the vehicle body of the vehicle.

11. Device according to claim 10, wherein the location-detection unit detects the change in location of the at least one vehicle camera according to the rotation captured by the rotation-capture unit.

12. A device for providing a vehicle surround view for a vehicle, comprising:

vehicle cameras which provide camera images of a vehicle environment of the vehicle;

a location-detection unit which detects a change in location of at least one vehicle camera relative to a normal driving or standing plane of the vehicle; and an image data processing unit which projects the camera images provided by the vehicle cameras onto a projection surface to generate the vehicle surround view, which projection surface is adapted according to the detected change in location of the vehicle camera, wherein a display unit displays the generated vehicle surround view to a driver of the vehicle.

13. Device according to claim 1, wherein the vehicle is located on a tilted plane or is tilted with respect to a horizontal plane.

14. Device according to claim 1, wherein the normal driving or standing plane is a horizontally extending reference plane.

15. A method for providing a vehicle surround view for a vehicle, comprising:

(a) generating camera images of the vehicle environment of the vehicle by means of vehicle cameras;

(b) detecting a change in location of the vehicle cameras relative to a normal driving or standing plane of the vehicle;

(c) adapting a projection surface according to the detected change in location of the vehicle cameras;

(d) projecting the generated camera images onto the adapted projection surface in order to generate the vehicle surround view; and (e) at least one of (i) rotate the projection surface about one or more axes of rotation relative to the normal driving or standing plane and (ii) shift said projection surface in a translational manner relative to a coordinate system origin, according to the detected change in location of the at least one vehicle camera.

16. A driver assistance system for a vehicle, comprising:

a device for providing a vehicle surround view for the vehicle comprising (i) vehicle cameras which provide camera images of a vehicle environment of the vehicle, (ii) a location-detection unit which detects a change in location of at least one vehicle camera relative to a normal driving or standing plane of the vehicle, and (iii) an image data processing unit which projects the camera images provided by the vehicle cameras onto a projection surface to generate the vehicle surround view, which projection surface is adapted according to the detected change in location of the vehicle camera, wherein the image data processing unit is operable to at least one of (i) rotate the projection surface about one or more axes of rotation relative to the normal driving or standing plane and (ii) shift said projection surface in a translational manner relative to a coordinate system origin, according to the detected change in location of the at least one vehicle camera.

* * * * *